Figure 1:
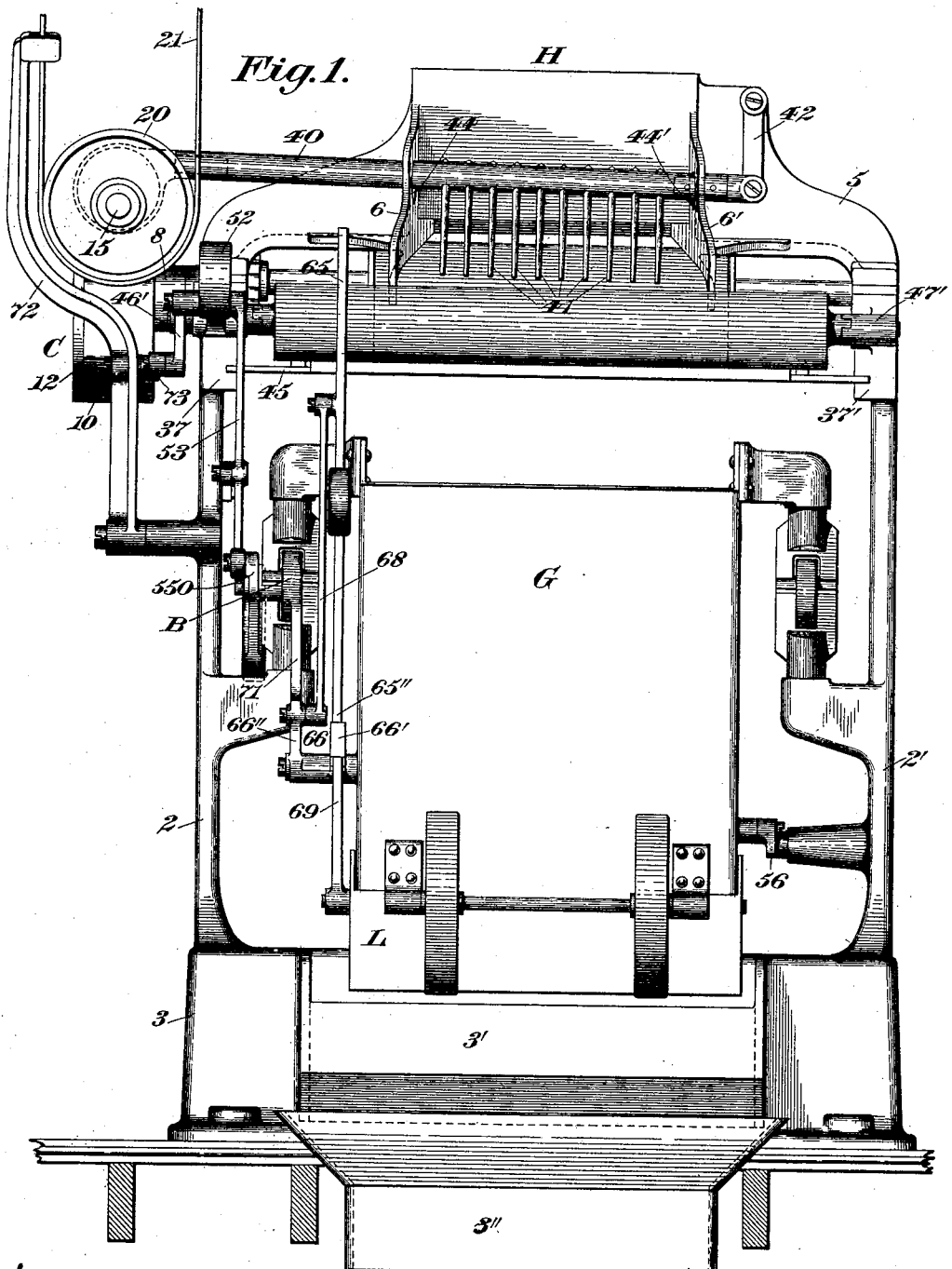

No. 615,197. Patented Nov. 29, 1898.
F. H. RICHARDS.
WEIGHING MACHINE.
(Application filed Nov. 18, 1897.)
(No Model.) 6 Sheets—Sheet 1.

Witnesses:
C. W. Smith
Fred J. Dole

Inventor:
F. H. Richards.

No. 615,197. Patented Nov. 29, 1898.
F. H. RICHARDS.
WEIGHING MACHINE.
(Application filed Nov. 18, 1897.)

(No Model.) 6 Sheets—Sheet 2.

Witnesses;
O. W. Smith
Fred. J. Dole

Inventor:
F. H. Richards

No. 615,197. Patented Nov. 29, 1898.
F. H. RICHARDS.
WEIGHING MACHINE.
(Application filed Nov. 18, 1897.)

(No Model.) 6 Sheets—Sheet 3.

Witnesses:
O. W. Smith
Fred. J. Dole.

Inventor:
F. H. Richards.

THE NORRIS PETERS CO., PHOTO-LITHO., WASHINGTON, D. C.

No. 615,197. Patented Nov. 29, 1898.
F. H. RICHARDS.
WEIGHING MACHINE.
(Application filed Nov. 18, 1897.)
(No Model.) 6 Sheets—Sheet 4.
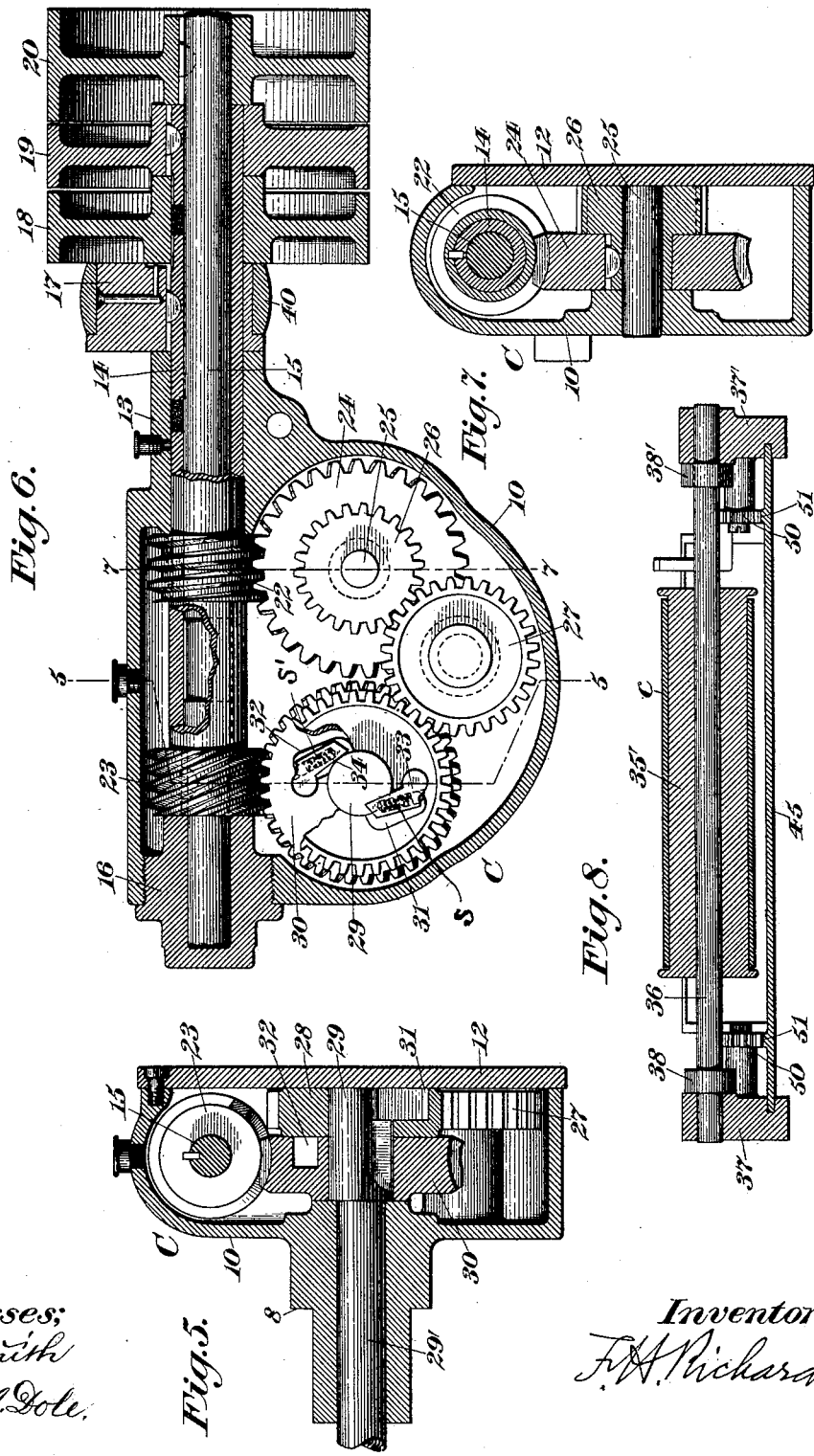
Witnesses:
O. W. Smith
Fred. J. Dole.
Inventor:
F. H. Richards.

No. 615,197. Patented Nov. 29, 1898.
F. H. RICHARDS.
WEIGHING MACHINE.
(Application filed Nov. 18, 1897.)
(No Model.) 6 Sheets—Sheet 5.

Witnesses:
O. W. Smith
Fred. J. Dole.

Inventor:
F. H. Richards.

No. 615,197. Patented Nov. 29, 1898.
F. H. RICHARDS.
WEIGHING MACHINE.
(Application filed Nov. 18, 1897.)
(No Model.) 6 Sheets—Sheet 6.

Witnesses:
O. W. Smith
Fred. J. Dole.

Inventor:
F. H. Richards.

UNITED STATES PATENT OFFICE.

FRANCIS H. RICHARDS, OF HARTFORD, CONNECTICUT.

WEIGHING-MACHINE.

SPECIFICATION forming part of Letters Patent No. 615,197, dated November 29, 1898.

Application filed November 18, 1897. Serial No. 659,024. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines adapted for weighing predetermined quantities of material and particularly such materials as are of a sluggish nature and need to be positively advanced by means of suitable force-feeding mechanism; and one of the main objects of the invention is to provide improved differential driving mechanism in the nature of speed-reducing gearing, by means of which the movements of such force-feeding mechanism may be controlled and the material of which the charge is composed may be advanced at different rates of speed during different periods in the operation of the stream-controlling means, of which, as will be obvious, such feeding mechanism will always form a part and which in some cases may constitute the sole means for regulating the advance of the substance and the flow of the same into a suitable load-receiver.

The improved differential driving mechanism or speed-reducing gearing just referred to embodies as its essential features a pair of driving members operatively connected with a pair of differential gear-trains, which gear-trains will be connected with each other and one of which will embody a clutch and a loose movement-transmitting member or gear controlling such clutch, the construction of these parts being such that the movement of either driving member can be transmitted through its proper differential gear-train to a driven member and the latter rotated at either one of two different rates of speed, this driven member serving in this instance to impart a relatively-rapid movement to a suitable force-feeder for supplying the main stream of material to the load-receiver when the high-speed gear-train is in action and to operate a feeder relatively slowly to supply the drip-stream to the load-receiver when the low-speed gear-train is in action. In the construction illustrated herein, which is the one preferred by me, these two differential gear-trains are connected in such a manner that the driven member controlled thereby will always be rotated or operated in the same direction or in the same manner by the action of the two gear-trains, and these gear-trains will also embody two separately-operative loose movement-transmitting members or gears, one of which controls one clutch, by means of which its movement may be transmitted to a driven member, while the other loose gear controls another clutch, by means of which the rotation of such second gear may also be imparted to a driven member or shaft.

In connection with the differential driving mechanism or speed-reducing gearing, the essential features of which have just been outlined, I prefer to employ a stirrer for loosening up the material to be advanced by the feeder, which feeder will usually be an endless conveyer or apron, and this stirrer is intended to be carried by an eccentric on the driving member of the low-speed gear-train, so that the stirrer will be operated directly by such eccentric during the time when the feeder or conveyer has a relatively slow movement for feeding the drip material into the load-receiver. I prefer to connect the stirring device also with a suitable member, preferably a fixed member of the framework, in some suitable manner—as, for instance, by means of a link—so that said device will have a compound movement made up in this instance of a reciprocating motion transversely of the line of flow of the stream in a substantially horizontal direction and a lifting or substantially vertical movement to enable it to dip into and withdraw from the material supported on the conveyer. This guide may be connected with the stirring device advantageously at a point thereof remote from the point of connection of the stirrer with the eccentric in order to obtain the greatest possible effect.

A feature of this invention which I deem of special importance is the employment of stream-controlling means embodying a pair of valves disposed at opposite sides of the line of flow of the stream of material delivered into the bucket and connected in such a manner that both of them will move simultaneously toward the stream from opposite sides thereof to reduce the flow and eventually cut off the supply of material entirely, the connection between these two valves being preferably a direct one formed by means of gearing, which may be of any suitable type so long as the several devices coöperate to shift the valves toward each other during the descent of the load-receiver and to shift them away from each other on the rising of the receiver for the making up of a new load. Preferably I may make use of an oscillatory valve coöperating with a suitable slide-valve disposed in such a position that the oscillatory valve will close under the forward or stream-regulating end of the slide-valve, and the oscillatory valve may be geared directly to the slide-valve by means of a gear or idler coöperating with the teeth of a rack on such slide-valve. The movements of these valves may be effected in any suitable manner; but I deem it desirable to make use of an actuator which will be carried directly by one of the valves for closing the two, the oscillatory valve being in this instance counterweighted to effect such closing movements of the two valves and having also a suitable connection—as, for instance, by means of a thrust-rod—with the beam mechanism or other actuating part of the weighing mechanism.

In connection with the stream-controlling means just described and with the differential driving mechanism for the force feeder or conveyer I also make use of an automatic belt-shipper for shipping a belt onto either one of a pair of pulleys controlling, respectively, the high and low speed gear-trains, (a third or loose pulley being also used for effecting the stoppage of the movement of the feeder or conveyer), this belt-shipper being regulated in its movements in one direction by the closing of a suitable valve, such as the oscillatory valve previously described, and in the other direction by the return of the weighing mechanism to its normal counterpoised position.

In order that the mechanism may not begin to operate for the making up of a new load until all of the previously-discharged load shall have passed away from the machine and until the shiftable member or load-discharger of the receiver is in its normal closed position, I have illustrated herein novel regulating means for governing the action of the machine. The essential feature of this regulating mechanism is a counterpoised or counterweighted locking device or latch for locking the weighing mechanism, in this instance at a predetermined point in the descent thereof, this locking device being effective for maintaining the weighing mechanism and the receiver in the overpoised or down position thereof until the locking device is released by suitable releasing means, which action in this case will be accomplished by the return of the closer or load-discharger to its shut position.

Obviously the several stream-controlling members should be locked positively on the descent of the load-receiver, so that no material for a new load will be fed into the receiver until the load-discharger or closer is shut. Hence I have illustrated herein suitable stop devices for this purpose, one of which is controlled by the shiftable member or closer of the load-receiver and the other by the latch, the former stop device being shiftable into engagement with a stop or any one of a series of stops on the driving member of the feeder or conveyer, while the latter may be supported on a pivoted counterweighted member or lever connected directly with the latch for the load receiver or bucket and governed by the main latch-tripper, which in this instance will be carried by the beam mechanism and will not release the latch until such beam mechanism is freed by the return of the closer to its normal or shut position.

Figure 2:
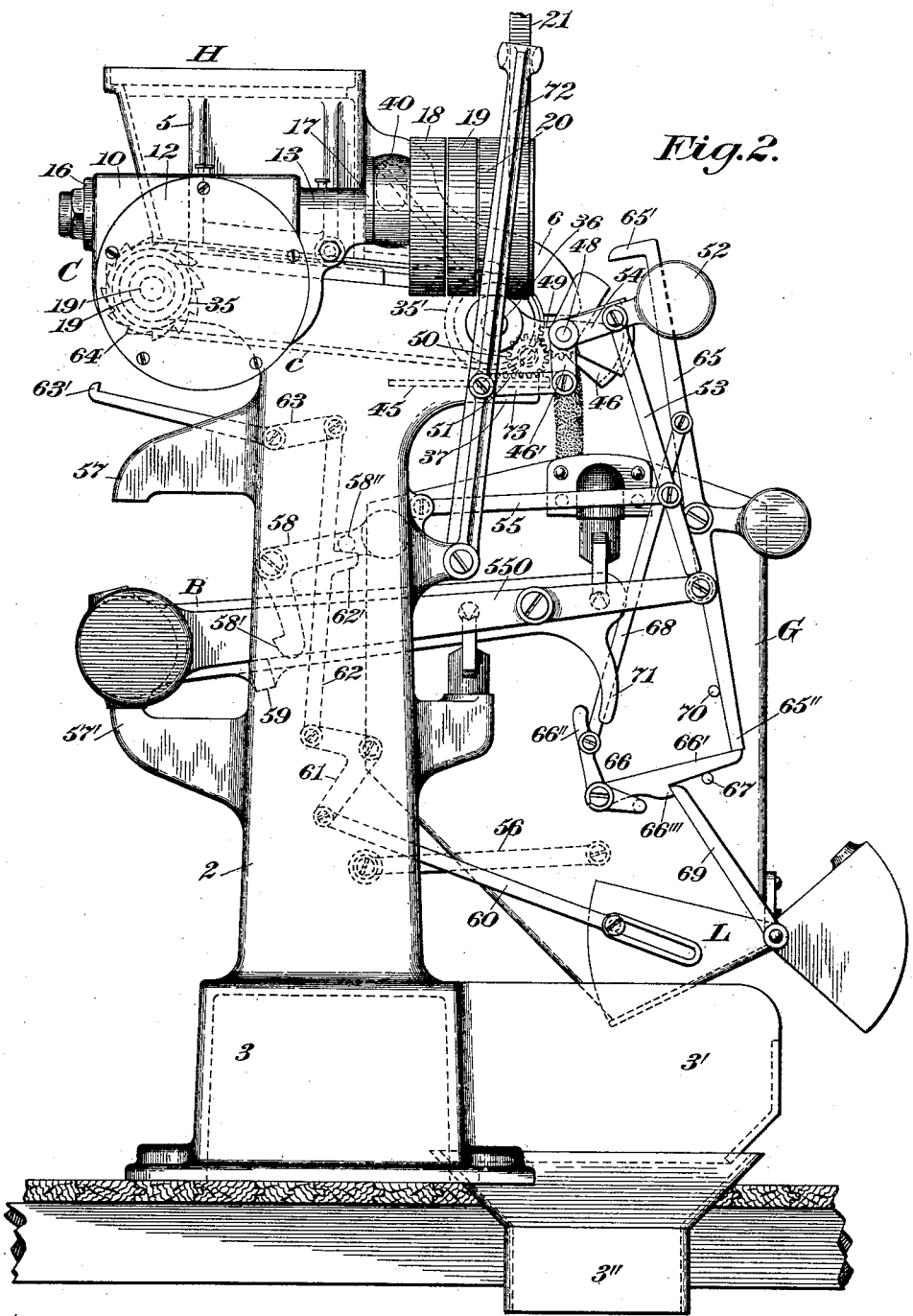
Figure 3:
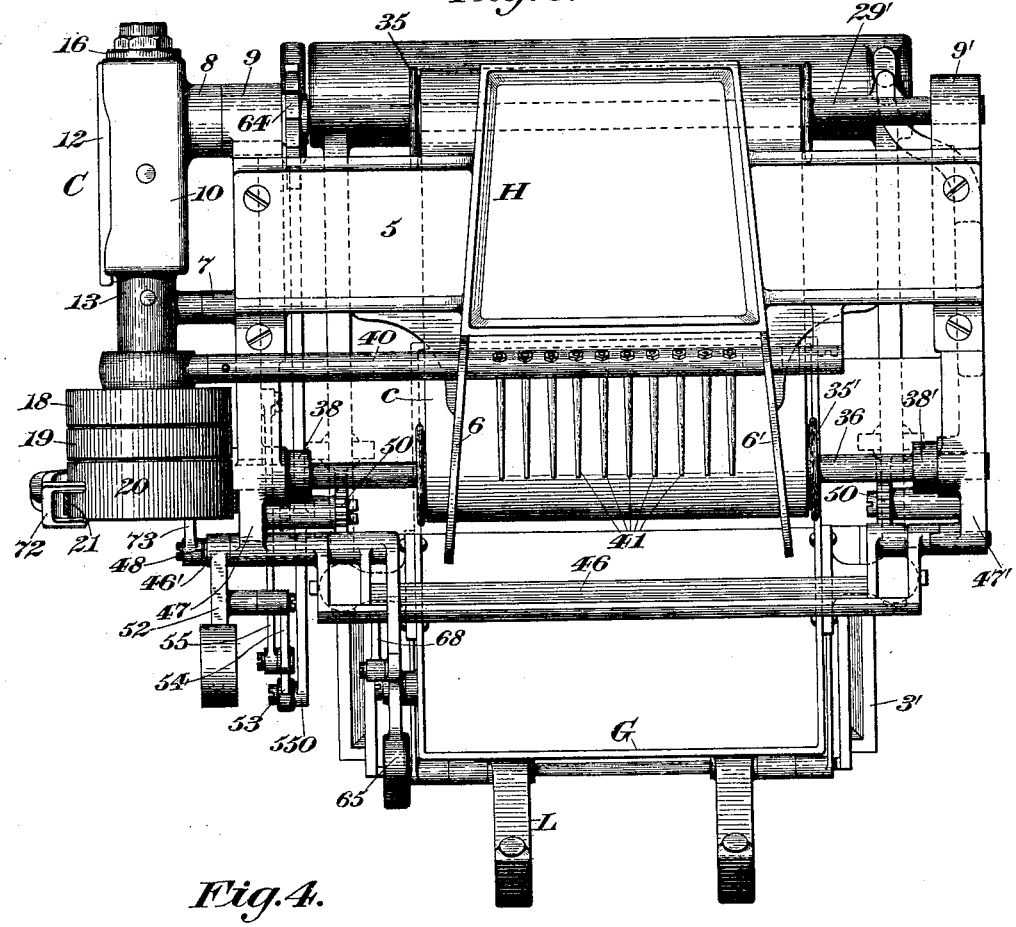
Figure 4:
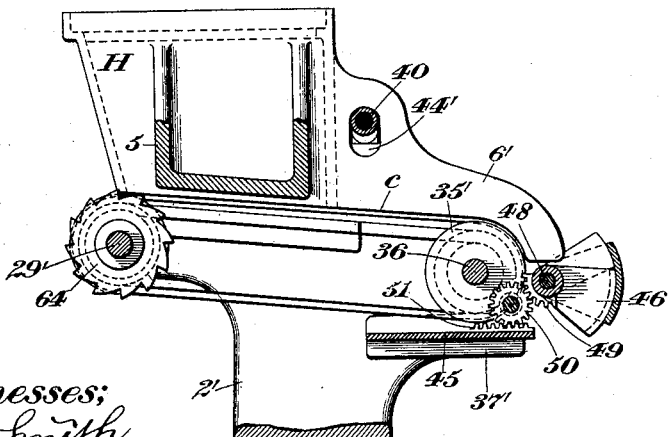
Figure 9:
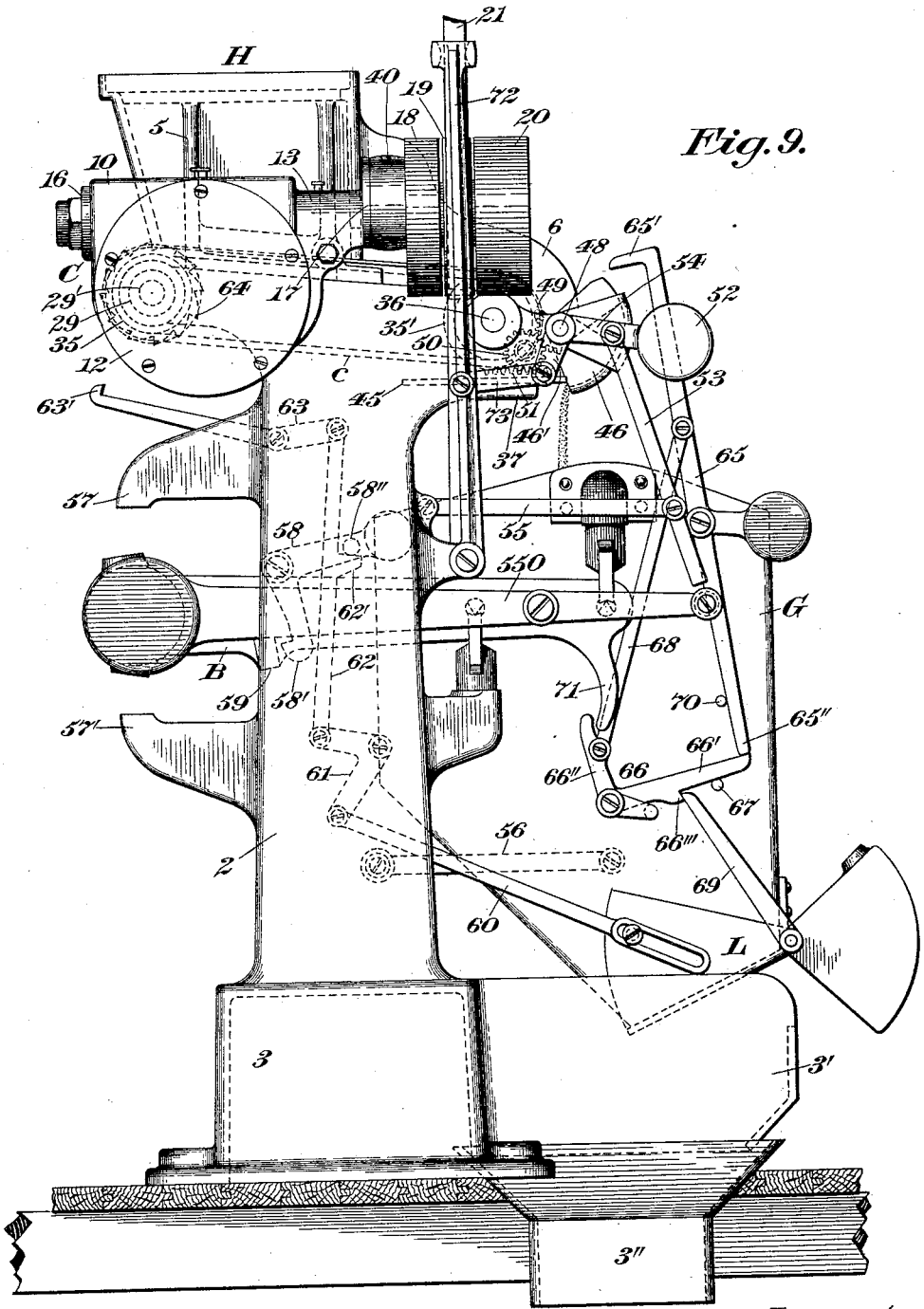
Figure 10:
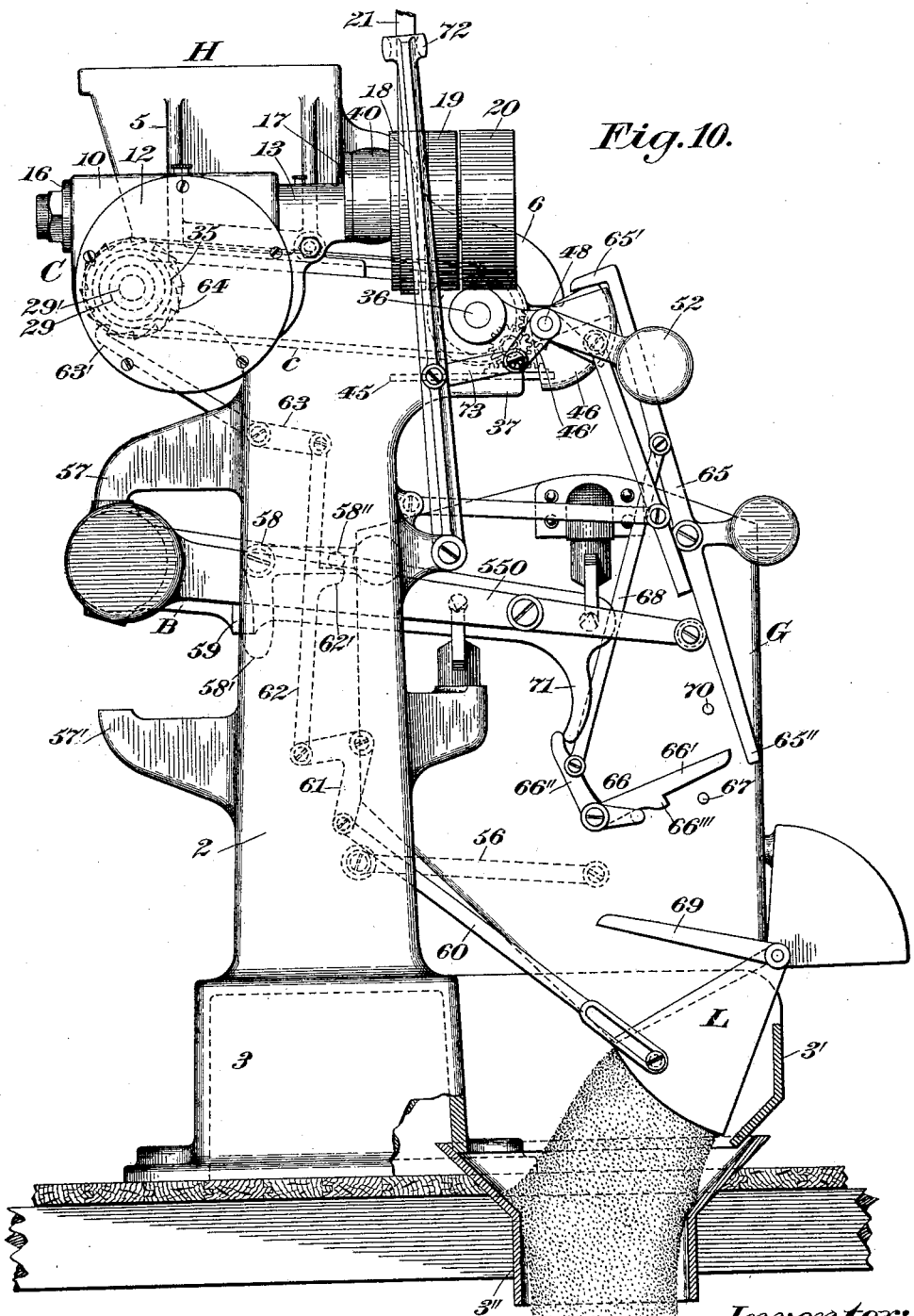

In the drawings accompanying and forming part of this specification, Figure 1 is a front elevation of an automatic weighing-machine embodying my present improvements. Fig. 2 is a side elevation of the same, showing the parts in their normal positions for the making up of a new load. Fig. 3 is a plan of the machine. Fig. 4 is a detail sectional side elevation of the upper part of the machine, illustrating the manner in which the oscillatory valve and the slide-valve hereinbefore described are geared together. Fig. 5 is an enlarged transverse section, taken in line 5 5, Fig. 6, of the differential driving mechanism or speed-reducing gearing and illustrates the loose power-transmitting members of the differential gear-train. Fig. 6 is a central longitudinal section through the gear-case and driving members of said differential driving mechanism. Fig. 7 is a transverse section of the same, the section being taken in the line 7 7, Fig. 6, and illustrates particularly the opposite differential gear-train from that shown in Fig. 5. Fig. 8 is a detail sectional front elevation of a portion of the stream-controlling means, illustrating the driving connections between the oscillatory valve and the slide-valve and the manner in which the latter coöperates with the force-feeder or conveyer. Fig. 9 is a side elevation corresponding to Fig. 2, but with parts removed, and illustrates the positions of the several devices during the drip period; and Fig. 10 is a view similar to Fig. 9, showing the positions of the parts on the discharge of the completed load from the load-receiver.

Similar characters designate like parts in all the figures of the drawings.

The several operative parts of my improved weighing-machine may be carried by any suitable framework. That shown herein has a hollow base 3, from the forward side of which extends a hopper 3', from which the discharged loads may be delivered through a discharge-conduit, such as 3''. From the base 3 rise two side frames, (designated herein by 2 and 2', respectively,) these side frames being connected at their upper ends by a top beam 5, carrying the usual hopper or stream-supplying means H. The upper ends of the side frames 2 and 2' are somewhat enlarged, so as to form substantially T-heads, in order that they may support in the proper manner a feeder which in this instance will be an endless traveling belt or conveyer for advancing the material from the hopper H toward the delivery end of the stream-controlling means. The hopper H may also have projecting from the forward side thereof a pair of arms or brackets, such as 6 and 6', for confining the material supported on the traveling conveyer within proper bounds, these guides preferably diverging from the supply-hopper and having their lower edges close to the upper run of the conveyer.

The differential driving mechanism, by means of which the material for a charge is advanced toward the load-receiver, may be mounted in any suitable manner on the framework. In this instance it is supported at the left-hand side of the machine and at the upper end thereof, (see Figs. 2 and 3,) most of the movable parts of this driving mechanism being mounted within a suitable gear-case—such, for example, as that illustrated herein at C. At the forward end thereof this gear-case may be secured to the framework in any suitable manner, it being supported herein on a stud, such as 7. At the rear end thereof the gear-case may have projecting therefrom, as illustrated herein at 8, a bearing member supported in another bearing, such as 9, on the framework. In the construction shown this casing comprises a main member or casing proper (designated by 10) and a face-plate, (indicated by 12.) At the forward end thereof the casing has a long bearing, (designated by 13,) in which is supported a tubular spindle or driving member, such as 14, (see Fig. 6,) this tubular spindle being mounted in turn on a driving shaft or spindle, (designated by 15,) the rear end of said driving-shaft being supported in the journal-opening of a bearing member, such as 16, at the rear end of the casing. This bearing member 16 is in this case in the form of a cap externally screw-threaded and screwed into a correspondingly internally threaded opening in the casing proper. Immediately in advance of the forward end wall of the bearing portion 13 of the casing the tubular driving member 14 may have supported thereon and keyed thereto an eccentric, such as 17, so that said eccentric will be rotated in unison therewith, and immediately in advance of said eccentric may be placed two pulleys, one of which, such as 18, may constitute a loose pulley and the other, 19, a fast pulley, the latter of which may drive the tubular spindle 14. The driving shaft or spindle 15 should project beyond the forward end of the tubular spindle 14 and will have mounted thereon a driving member or pulley, such as 20, which will be keyed thereto. It will be clear now that by means of a suitable driving-belt, such as that indicated herein at 21, the tubular spindle 14 or the shaft 15 may be rotated, or the loose pulley 18 may be rotated while both of said spindles are idle.

The two spindles just described constitute driving members by means of which movements may be transmitted to two differential gear-trains constituting the main elements of the differential driving mechanism or speed-reducing gearing. In this case the tubular spindle 14 has keyed thereonto a gear or worm, such as 22, preferably of slow pitch, while the shaft 15 may have keyed thereto in a corresponding manner a gear or worm, such as 23, preferably of relatively quick pitch, this last-mentioned worm being in this case positioned between the forward end wall of the bearing 16 and the rear end of the tubular spindle 14. The worm 22 meshes with a transmitting-gear, such as 24, supported on a stud 25, carried by the two members of the casing, (see Fig. 7;) but this gear 24 is not carried directly by the stud, but instead is supported on the hub of a pinion, such as 26, carried for rotation directly by said stud, the gear 24 being keyed to the hub of the pinion 26. The pinion 26 transmits its movement in turn to an idler gear or pinion, such as 27, also supported within the casing in a manner which will be obvious by referring to Fig. 5, the teeth of this idler meshing in turn with another gear, such as 28, supported for rotation on the outer end of a driven member or shaft, such as 29, by means of which movement may be imparted in this case to the feeder or endless conveyer. In the construction shown the worm-gear which meshes with the worm 23 and is illustrated herein at 30 is also mounted on the outer end of the shaft 29, this worm-gear being positioned between the gear 28 and a suitable bearing-cheek on the casing proper, 10. Both of the gears 28 and 30 are loosely mounted on the shaft 29 and both constitute movement-transmitting members, the former to transmit to the shaft 29 the movements of the tubular spindle 14 and the worm 22 and the latter to transmit the rotation of the shaft 15 and the worm 23 to said shaft 29. Hence these loose gears should be separately operative and each should be capable of engaging and rotating said shaft 29 independently of the other. For the purpose of effecting this result each shaft controls in this instance a separate clutch, by means of which it may be made fast to the shaft temporarily whenever it is rotated directly by another member. Two clutches are illustrated herein, one of which may be mounted in a suitable opening, such as 31, in the gear 28, and the other in a corresponding opening in the gear 30. The clutch member which is mounted in the opening 31 is designated by 33 and that which is supported in the opening 32 is designated by 34.

These two clutch members are in the nature of clutch-pawls, and they may be normally pressed toward the shaft 29 in some well-known manner, as by means of springs, as $s$ and $s'$. The maner in which clutches of this type operate is well understood and need not be described in detail. It will be seen, however, that if movement is transmitted through the spindle 14 and worm 22 to the loose gear 28 the latter will be clutched to the shaft 29 and will turn the latter, while the worm or loose gear 30 is free and does not rotate, and that if movement is transmitted to the worm-gear 30 to the worm 23 and the shaft 15 said worm-gear will be clutched to the shaft 29 and rotate the latter, while the loose gear 28 will be prevented from turning.

The driven member or shaft 29 passes through the bearing member 8, projecting inwardly from the rear end of the casing member 10, which bearing member 8 is, as before stated, mounted in the bearing member 9, the main portion of this shaft being reduced, as indicated at 29', and journaled at its opposite end in a corresponding bearing 9' at the other side of the framework. This shaft is intended to form the driver for a suitable feeder, which in this instance will be in the form of an endless belt or conveyer, and at the rear end of the machine this endless conveyer, which is indicated by $c$, may pass over a suitable roller or cylinder, such as 35, the conveyer being carried at the forward side of the machine around a similar cylinder or roller, such as 35', mounted on a shaft, such as 36, journaled at its opposite ends in bearings, such as 37 37', (see Fig. 8,) the shaft being located by means of suitable stops, such as 38 and 38'. The manner in which high-speed and low-speed movements of the differential driving mechanism are transmitted to this conveyer for feeding forward the material of the main stream or the drip-stream will be obvious. In connection with this feeder or conveyer I prefer to make use of a suitable stirring device for loosening up to some extent and spreading the material passing over the upper run of the endless belt $c$, especially when this material is a substance of a sluggish nature. The stirring device which I prefer to employ is in this instance carried directly on the eccentric 17 of the tubular spindle 14, and hence the movements of said eccentric will be imparted to the stirring device to reciprocate the latter transversely of the path of flow of the material traveling over the belt. In this instance I have shown a simple form of stirring device embodying as its essential elements a carrier preferably in the form of a strap-rod, such as 40, the eye of which encircles in the usual manner the eccentric 17, while the rod portion thereof has secured thereto a plurality of stirring arms or blades, such as 41, which are of any suitable construction. I prefer to connect this stirring device to some suitable member, preferably a fixed part of the framework, in such a manner that the stirring device as a whole will have a compound movement—one that has just been described—and the other a tipping movement into and out from the mass of the material supported on the upper run of the conveyer $c$. This connection will preferably be made with the extreme free end of the strap-rod, a link being shown at 42 (see Fig. 1) connected to the top beam 5 of the machine and forming a guide for the stirring device. The strap-rod 40 in this instance is passed through the projecting arms or brackets 6 and 6' of the hopper H, and in order to accommodate the substantially vertical movements of the strap-rod due to its connection to the framework by means of the link 42 the arms or brackets 6 and 6' preferably have therein elongated openings 44 and 44'. This conveyer $c$ obviously constitutes a stream-controlling member; but in connection therewith I prefer to employ other stream-controlling devices for controlling positively the volume of the flow-stream during the drip period and also the cutting off of the supply. Hence I have illustrated herein a pair of valves, one disposed at one side of the path of the flow-stream and the other at the opposite side, one of these valves being preferably oscillatory, while the other is a reciprocatory valve or slide-valve. The reciprocatory valve is designated in a general way by 45, and is preferably in the form of a flat valve supported at its ends in guideways in the supports or bearing members 37 and 37'. (See Figs. 4 and 8.) The oscillatory valve may be such a one as that indicated at 46 and will be supported in the construction shown in these drawings for oscillation in journals carried at opposite sides of the machine by a pair of forwardly-projecting arms, such as 47 and 47', on the framework.

The valve 46 oscillates about an axis 48 and is supported in the usual manner. It also carries for movement in unison therewith a pair of gears, preferably segmental ones and designated herein by 49, which gears in turn mesh with corresponding idlers, such as 50, supported for rotation on studs projecting inwardly from the bearing members 37 and 37'. (See Fig. 8.) The idlers 50 may mesh in turn with a pair of racks, such as 51, at opposite ends of the slide-valve 45, although any other direct-geared connection than that just described may be employed for causing one of the stream-controlling valves to move simultaneously with the other toward the flow-stream to reduce the volume thereof and to finally cut off the flow. It will be noticed that the valve 46 closes under the forward end of the slide-valve 45. For the purpose of actuating these valves to close the same I may make use of any suitable actuating means in operative relation with one of said valves; but I prefer to counterweight the oscillatory valve 46—as, for example, in the manner shown herein, by the counterweighted arm 52. The closing movement of this oscillatory valve, and hence of the slide-valve, will of course be effected by this counterweighted arm, but it should be controlled, preferably in the usual manner, by the descent of the beam mechanism.

The valve-opening actuator, by means of which the two valves 46 and 45 will be operated, may be of any suitable or usual type, and will be controlled in this case by the return of the weighing mechanism to its normal position on the ascent of the load-receiver. In the construction shown the usual counterweighted lever 550 is supported on the beam mechanism of the weighing-machine and at the inner end thereof coöperates with a valve-opening thrust-rod, such as 53, which in turn may be pivoted to a rock-arm, such as 54, movable in unison with the oscillatory valve 46. The thrust-rod 53 may be guided in its movements in the usual manner by means of a link 55.

Any suitable type of weighing mechanism may be employed in connection with the stream-controlling means just described; but I prefer to make use of a beam mechanism of the "single-beam" type, such as that indicated herein at B, carrying on the poising side thereof a load-receiver, such as G, having a load discharger or closer, such as L. The beam mechanism will be mounted in the usual manner on knife-edge bearings on the framework and the load-receiver by similar bearings on the beam mechanism, and the counterweighted lever 550 will have its pivot between the knife-edge bearings of the bucket and the beam. The swinging of the lower end of the bucket may be regulated by a guide-link, such as 56. It will be noticed that the beam mechanism shown herein is limited in its movements in opposite directions by means of stops, such as 57 and 57', on the main framework.

For the purpose of preventing the premature return of the weighing mechanism to its normal position I have illustrated herein regulating apparatus controlled by the movements of the shiftable member or load-discharger of the load-receiver. In this case a counterpoised locking device, in the form of a counterweighted latch, is illustrated at 58 on the framework, and this has a holding face or detent, such as 58', adapted to engage a coöperative stop-face, such as 59, on a suitable part of the weighing mechanism, preferably on a beam-arm. This latch is so disposed that when the load-receiver descends to its lowest position the detent 58' will engage the stop 59, as shown in Fig. 10, and the beam will be locked between the detent 58' and the stop 57 on the framework. In order to release this latch or locking device, I make use of closer-operated connections embodying a latch-tripper. The connection illustrated comprises a connecting rod or link 60, connected with the load-discharger by means of a slip-joint and pivoted to one arm of an angle-lever 61 on the framework, the other arm of the angle-lever being in turn pivoted to a connecting rod or link 62, which at its upper end is pivoted to the short arm of a lever 63 on the framework, which lever at its opposite end has a stop or pawl, such as 63', for a purpose which will be referred to more particularly hereinafter. On one member of the connection from the closer—in this case on the link 62—I have illustrated a closer-operated latch-tripper 62', by means of which the latch 58 may be released from the beam mechanism on the closing of the load-discharger, this arm 62' constituting a releasing device adapted to engage a projecting member, such as the stop 58'', on the latch 58 for disengaging the detent 58' from the stop-face 59 at such time.

The stop or pawl 63' constitutes one of a pair of devices for preventing premature operation of the members of the stream-controlling means, said pawl coöperating in this instance with a corresponding member for controlling the movements of the conveyer c. The member which coacts with the stop or pawl 63' may be a stop or series of stops on the shaft 29, by which the conveyer is driven, and into the path of this stop or stops on said shaft the stop or pawl 63' may project; but I prefer to secure to said shaft a ratchet-wheel, such as 64, having relatively long teeth, with any one of which the pawl 63' may engage when the closer opens wide and operates the intermediate connections. The other locking device is in the nature of a valve-opening-movement limiter or stop-segment, and is controlled in this case by the usual closer-latch through the medium of a beam-operated latch-tripper. The stop proper may be carried at 65' at the upper end of a swinging member or lever, such as 65, pivoted on the load-receiver G and counterweighted, this lever having at its opposite end at 65'' a stop for preventing premature release of the latch. The latch illustrated is of the "by-pass" type, and is designated in a general way by 66, it being mounted on the bucket and having a by-pass-latching arm 66', limited in its movement by a suitable stop, such as 67, on the load-receiver, and also controlled as to its position relatively to the main member of the latch in the usual manner. To the arm 66'' of the latch there is pivoted in this instance a connecting rod or link, such as 68, which at its opposite end is pivoted in turn to the lever 65 at the upper side of the pivot of the latter, so as to provide a direct connection between the latch and the stop-face 65'. The detent of the latch is indicated herein by 66''' and may engage in the usual manner an arm, such as 69, movable in unison with the usual counterweighted closer L.

It will be clear that when the closer is shut, as shown in Fig. 2, and the stop-lever 65 is carried to the limit of its movement by its counterweight and is held at such point against any suitable stop, such as 70, the detent-face 66''' of the latch will engage with the arm 69, and the arm 66' of the latch will in turn be held by the stop-face 65'' of the lever 65, while the stop-face 65' will be clear of the valve 46, the opening movement of which it is intended to control.

As before stated, the latch-tripper which I prefer to employ for releasing this latch is carried by the beam mechanism. It is illustrated at 71, and is in the form of a depending arm carried by the beam mechanism and projecting into the path of the upper end 66'' of the latch 66. When the load-receiver descends, said latch-tripper will engage said arm of the latch and release the latter, the arm 66'' of course pulling at such time on the end of the link 68 to oscillate the lever 65.

For the purpose of shifting the belt 21 onto any one of the pulleys 18, 19, and 20 I may employ a belt-shipper, such as 72, of the usual construction at a suitable point on the framework. The movements of this belt-shipper should of course correspond to those of the valve mechanism for controlling the supply of material to the load-receiver, and in this instance the belt-shipper is directly connected with the oscillatory valve 46, the connection being preferably effected by means of a link, such as 73, pivoted to the belt-shipper and to the end of a rock-arm, such as 46', movable in unison with the oscillatory valve.

The operation of a machine constructed in accordance with my present improvements, as illustrated in the construction shown in the drawings of this application, is as follows: It being understood that the parts are in their normal positions for delivering a load into the receiver G, it will be seen that the two valves 45 and 46 are wide open, the closer shut, and the belt 21 on the pulley 20 for driving the conveyer c at its maximum speed, the rotation of the shaft 29 being effected at such time by means of the shaft 15, the worm 23, and the worm-gear 30. At this time the material carried forward by the upper run of the belt c will be delivered over the forward end of said run in a full stream into the receiver G in the usual manner. The pulley 20 has a comparatively wide face, and the driving-belt 21 is relatively narrow, and as the load-receiver descends said belt will of course be shifted gradually toward the pulley 19, but will not pass thereonto until the major portion of the load has been made up in the bucket and the latter has almost reached the poising-line. As soon as this position of the bucket is reached the valve 46, and through it the valve 45, will be held in the drip position by the usual pointer engaging a suitable by-pass stop on the weighing mechanism. The pointed and the by-pass stop are not illustrated herein; but these parts may be of the kind shown in Letters Patent No. 548,840, granted to me October 29, 1895, to which reference may be had. As the valves reach this position the belt 21 is shifted onto the pulley 19 (see Fig. 9) and the shaft 15 and its operating connections to the shaft 29 cease rotating, and the latter is driven by means of the tubular spindle 14, the worm 22, the worm-gear 24, pinion 26, idler 27, and the gear 28, which is now clutched to the shaft 29 and rotates the latter at a reduced speed to feed the drip material forward at a relatively slow speed to the two valves 45 and 46, which will have been shifted toward each other by the counterweight 52 during the period of the poising of the weighing mechanism. When the tubular spindle 14 starts rotating, the eccentric 17 will of course actuate the stirring device, and the arms 41 will move transversely of and dip into and out from the material moving with the upper portion of the belt c and will stir up the drip material in order to assure the positive feeding thereof. When the full load is made up in the receiver G by the addition of the drip material, the pointer controlling the oscillatory valve 46 will be released by the by-pass on the load-receiver, and the counterweight 52 will at once cause said oscillatory valve and the slide-valve 45 to shut quickly, the connections to the belt-shipper 72 causing the latter to shift the belt 21 onto the pulley 18 at the same time, thus causing the stopping of the rotation of the shaft 29 and of the movement of the stirring device. Immediately after the shipping of the belt 21 the latch-tripper 71 releases the latch and throws the stop-arm 65' into engagement with the upper edge of the valve 46, as shown in Fig. 10. On the release of the latch 66 the weight of the load of course shifts the closer to its open position and the latter, through its connections to the pulley 63', causes the engagement of said pulley with one of the teeth of the ratchet-wheel 64. On the opening of the closer the locking device 68 engages the beam mechanism and locks the same in the position shown in Fig. 10. The parts remain in the positions shown in these views until all of the material of the load shall have passed by the closer, when the latter, returning to its normal position, will release the locking device 58 by the engagement of the stop 62' with the stop 58'', and the pawl 63' will be withdrawn from engagement with the teeth of the ratchet-wheel, whereupon the load-receiver will rise and with it the other parts of the weighing mechanism. As soon as the main latch-tripper 71 is withdrawn from engagement with the latch 66 the counterweighted lever 65 will return to its normal position and the closer will be latched shut again. The thrust-rod 53 will also open the valve 46 and with it the slide-valve 45 and at the same time shift the belt onto the pulley 20 again, when all of the parts will be in their normal positions for the making up of a new load.

Having described my invention, I claim—

1. The combination, with a pair of driving members, of a pair of differential worms carried, respectively, by said respective driving members, and operating connections between said worms and embodying a clutch and also having a loose gear controlling said clutch and operative by one of said worms.

2. The combination, with a pair of driving members, of a pair of differential gears carried, respectively, by said respective driving members; a pair of transmitting-gears in mesh with the respective gears on said driving members; a driven member; a loose gear carried by said driving member; a clutch-pawl carried by said loose gear; and connecting means between said loose gear and one of the transmitting-gears.

3. The combination, with a pair of driving members, of two differential gear-trains operative, respectively, by said respective driving members, each of said gear-trains embodying a driving-gear carried by its driving member, and a transmitting-gear in mesh with its driving-gear, and connecting means between said gear-trains for rotating said transmitting-gears in the same direction, said connecting means embodying a loose gear and also having a clutch controlled by said loose gear.

4. The combination, with a driving-shaft and with a tubular driving-spindle journaled thereon, of fast pulleys secured, respectively, to said shaft and spindle; two connected differential gear-trains operative, respectively, by said shaft and spindle, one of said gear-trains embodying a clutch and also having a loose gear controlling said clutch and operative by the other gear-train; and a driven member connected with one of said gear-trains.

5. The combination, with a pair of driving members, of a driven member, and two connected differential gear-trains operative, respectively, by said respective driving members, said gear-trains embodying a pair of clutches and also having a pair of separately-operative loose gears controlling, respectively, said respective clutches.

6. The combination, with a pair of driving members, of a driven member; two connected differential gear-trains operative, respectively, by said respective driving members, each of said gear-trains embodying a driving-gear carried by its respective driving member, one of said gear-trains embodying a pair of clutches and also having a pair of separately-operative loose gears controlling, respectively, said respective clutches and loosely mounted on the driven member.

7. The combination, with a pair of driving members, of a driven member; two connected differential gear-trains operative, respectively, by said respective driving members, each of said gear-trains embodying a driving-gear carried by its respective driving member, one of said gear-trains embodying a pair of clutches and also having a pair of separately-operative loose gears controlling, respectively, said respective clutches and loosely mounted on the driven member, one of said loose gears being in mesh with the driving-gear of said gear-train.

8. The combination, with a pair of driving members, of high-speed and low-speed gear-trains, operative, respectively, by said respective driving members, one of said gear-trains embodying a clutch and also having a loose gear controlling said clutch and operative by the other gear-train; a driven member connected with one of said gear-trains; an eccentric on the driving member of the low-speed gear-train; and a feed device operative by said eccentric.

9. The combination, with a pair of driving members, of a loose pulley; a pair of fast pulleys secured, respectively, to said respective driving members; two connected differential gear-trains operative, respectively, by said respective driving members, one of said gear-trains embodying a clutch and also having a loose gear controlling said clutch and operative by the other gear-train; and a feeder operatively connected with one of said gear-trains and having differential feed movements.

10. In a weighing-machine, the combination, with stream-controlling means embodying a pair of feed devices, of a pair of driving members; high-speed and low-speed gear-trains operative, respectively, by said respective driving members for actuating one of said feed devices, one of said gear-trains embodying a clutch and also having a loose gear controlling said clutch and operative by the other gear-train; and an eccentric on the driving member of the low-speed gear-train and operatively connected with the other feed devices.

11. In a weighing-machine, the combination, with a pair of driving members, of high-speed and low-speed gear-trains operative, respectively, by said respective driving members, one of said gear-trains embodying a clutch and also having a loose gear controlling said clutch and operative by the other gear-train; an eccentric on the driving member of the low-speed gear-train; an endless stream-controlling conveyer; connections between said conveyer and one of said gear-trains; and a feed device coöperative with said conveyer and operatively connected with said eccentric.

12. In a weighing-machine, the combination, with a stream-controller, of a rotary driving member; an eccentric on said member; and a stirrer coöperative with said stream-controller and supported on, and operative by, said eccentric.

13. In a weighing-machine, the combination, with a support, of a stream-controller; a rotary driving member; an eccentric on said member; a stirrer coöperative with said stream-controller and supported on, and operative by, said eccentric; and a guide between said stirrer and the support.

14. In a weighing-machine, the combination, with a stream-controller, of a rotary driving member; an eccentric on said member; a strap-rod carried by said eccentric; and a stirring feed device operative by said strap-rod and coöperative with said stream-controller.

15. In a weighing-machine, the combination, with a support, of a stream-controller; a rotary driving member; an eccentric on said member; a strap-rod carried at one of its ends by said eccentric; a stirring feed device operative by said strap-rod and coöperative with said stream-controller; and a guide between the other end of the strap-rod and the support.

16. In a weighing-machine, the combination, with stream-supplying means, of a pair of coöperative valves disposed at opposite sides of the flowing stream and geared together and movable toward each other to vary the volume of the flowing stream; and means for automatically advancing said valves when the load-receiver reaches a predetermined point in its descent.

17. In a weighing-machine, the combination, with stream-supplying means, of an oscillatory valve at one side of the flow-stream; a slide-valve at the opposite side of said flow-stream; connecting means between said valves for actuating them simultaneously toward each other to vary the volume of the flow-stream; and valve-actuating means connected with one of said valves.

18. In a weighing-machine, the combination, with stream-supplying means, of an oscillatory valve at one side of the flow-stream; a slide-valve at the opposite side of said flow-stream; a gear carried by said oscillatory valve; an idler in mesh with said gear; a rack on said slide-valve and in mesh with said idler; and valve-actuating means connected with said oscillatory valve.

19. In a weighing-machine, the combination, with a rotary driving member, of a stream-controlling feeder operative by said driving member; a stop on said driving member; a load-receiver embodying a member shiftable for discharging a load; and a stop operative with said shiftable member of the load-receiver and shiftable into engagement with the stop on the rotary member on the discharge of a load.

20. In a weighing-machine, the combination, with a rotary driving member, of a stream-controlling feeder operative by said driving member; a circuit of stops on said driving member; a load-receiver embodying a member shiftable for discharging a load; and a stop operative with said shiftable member of the load-receiver and shiftable into the path of the stops on the rotary member on the discharge of a load.

21. In a weighing-machine, the combination, with a rotary driving member, of a stream-controlling feeder operative by said driving member; a ratchet-wheel on said driving member; a load-receiver embodying a member shiftable for discharging a load; and a stop-pawl operative with said shiftable member of the load-receiver and shiftable into engagement with the teeth of the ratchet-wheel on the discharge of a load.

22. In a weighing-machine, the combination, with weighing mechanism embodying beam mechanism, a load-receiver, and a stop on the beam mechanism, of a counterpoised locking device operative for engaging said stop and locking the weighing mechanism at a predetermined point in the descent of the load-receiver.

23. In a weighing-machine, the combination, with framework, of weighing mechanism embodying beam mechanism, a stop, and a load-receiver having a member shiftable for discharging a load; a counterpoised locking device on the framework and operative for engaging said stop and locking the weighing mechanism at a predetermined point in the descent of the load-receiver; and a releasing device operative on the return of the shiftable member of the load-receiver to its normal position.

24. In a weighing-machine, the combination, with framework, of weighing mechanism embodying beam mechanism, a stop, a load-receiver, and a load-discharger, of a counterweighted latch on the framework and operative for engaging said stop and locking the weighing mechanism at a predetermined point in the descent of the load-receiver, and a latch-tripper operative with the load-discharger on the closing of the latter.

25. In a weighing-machine, the combination, with a valve and with a load-receiver, of a latch; a latch-tripper; and a valve-opening-movement limiter pivoted on the load-receiver and operative by said latch on the tripping of the latter.

26. In a weighing-machine, the combination, with a valve and with a load-receiver, of a latch; a latch-tripper; and a counterpoised valve-opening-movement limiter pivoted on the load-receiver and operative by said latch on the tripping of the latter.

27. In a weighing-machine, the combination, with a valve and with a load-receiver, of a latch; a latch-tripper; and a valve-opening-movement limiter pivoted on the load-receiver and connected directly with said latch and operative with the latter on the tripping thereof.

28. In a weighing-machine, the combination, with stream-supplying means, of stream-controlling means embodying a feeder and a valve; differential driving mechanism for said feeder and embodying a plurality of driving-pulleys; a driving-belt; weighing mechanism; and a belt-shipper operative in one direction by the valve and in the other direction by the weighing mechanism.

29. In a weighing-machine, the combination, with stream-supplying means, of stream-controlling means embodying a feeder and a counterweighted valve; differential driving mechanism for said feeder and embodying a plurality of driving-pulleys; a driving-belt; weighing mechanism; a valve-opening thrust-rod between the weighing mechanism and the valve; and a belt-shipper operative in one direction by the valve and in the other direction by the weighing mechanism.

FRANCIS H. RICHARDS.

Witnesses:
 F. N. CHASE,
 JOHN O. SEIFERT.